United States Patent [19]

Vazquez Rubianes

[11] 4,235,319
[45] Nov. 25, 1980

[54] CLUTCH MECHANISM

[75] Inventor: Juan Vazquez Rubianes, Barcelona, Spain

[73] Assignee: Industrias Techno Matic, S.A., Spain

[21] Appl. No.: 904,594

[22] Filed: May 10, 1978

[30] Foreign Application Priority Data

May 17, 1977 [ES] Spain ........................... 459.059

[51] Int. Cl.$^2$ ............................................. B60K 41/24
[52] U.S. Cl. ..................................................... 192/8 R
[58] Field of Search ............... 192/8 R, 7, 41 R, 41 S, 192/45.1

[56] References Cited

U.S. PATENT DOCUMENTS

| 1,529,248 | 3/1925 | Green et al. .................... | 192/8 R |
| 1,572,265 | 2/1926 | Bostwick et al. ................ | 192/8 R |
| 1,572,635 | 2/1926 | Bostwick ......................... | 192/8 R |
| 2,052,094 | 8/1936 | Huff ................................ | 192/8 R |
| 2,561,159 | 7/1951 | Walton ............................ | 192/8 R |
| 3,576,240 | 4/1971 | Nicholson ...................... | 192/8 R |

*Primary Examiner*—George H. Krizmanich
*Attorney, Agent, or Firm*—Steinberg and Blake

[57] ABSTRACT

A clutch mechanism for use in rotationally operable devices, for example a window raising and lowering system of a vehicle, allows rotation in either direction when operated properly by means of a specially provided shaft, but prevents rotation if unauthorized attempts are made, for example to lower or raise the window. The shaft is connected to two or more lugs which on rotation co-act with respective wedge elements located in respective recesses at the periphery of a rotatable disc so that drive is transferred from the lugs to rotate the disc. At least one lug and associated wedge element is mounted in the same sequence in each circumferential direction around the disc so that the disc can be rotated in either direction. The disc is disposed in a circular opening of a support member such that attempts to rotate the disc by action on for example the lowering and raising device to which the disc is attached will cause one or more wedging elements to move into a wedging position between the disc and the support element.

3 Claims, 6 Drawing Figures

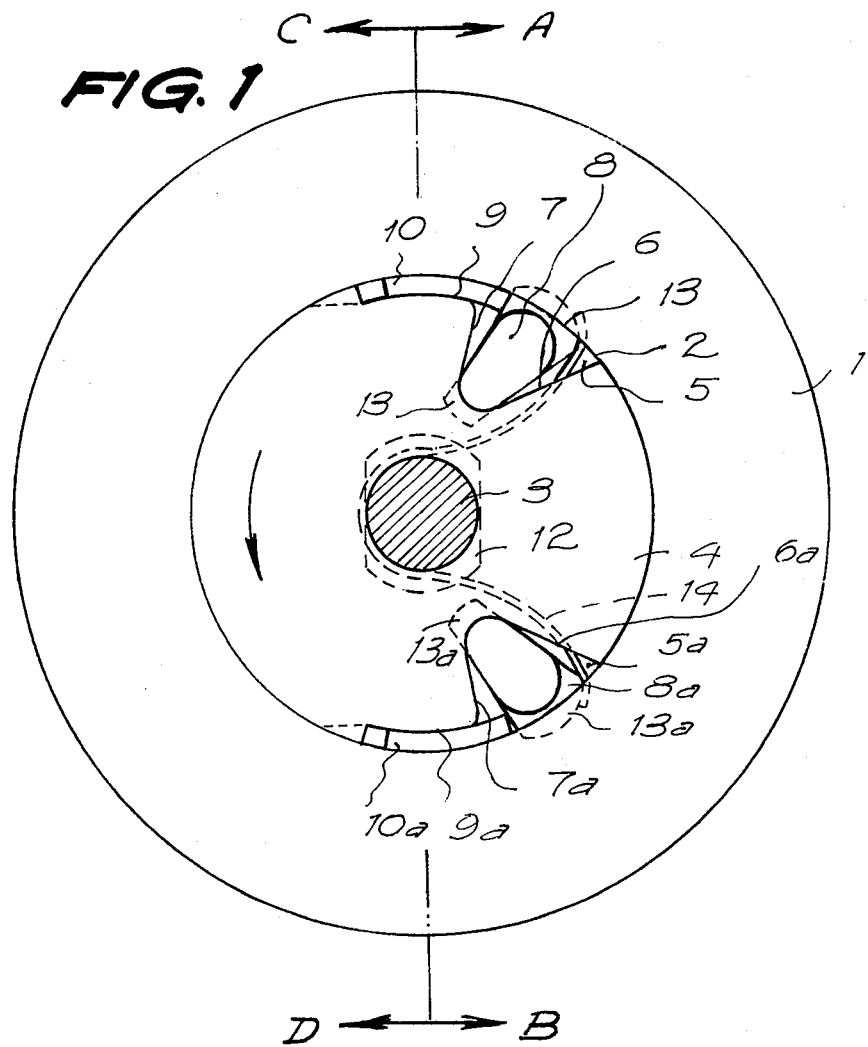

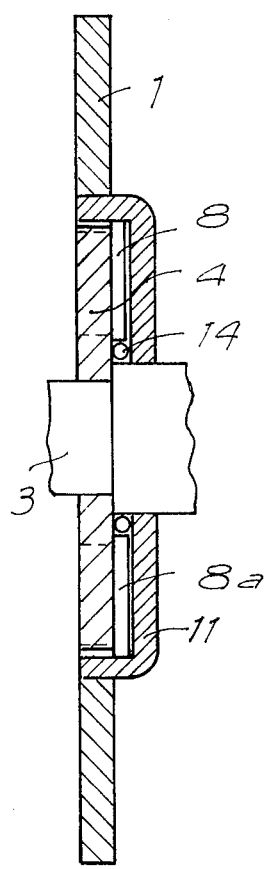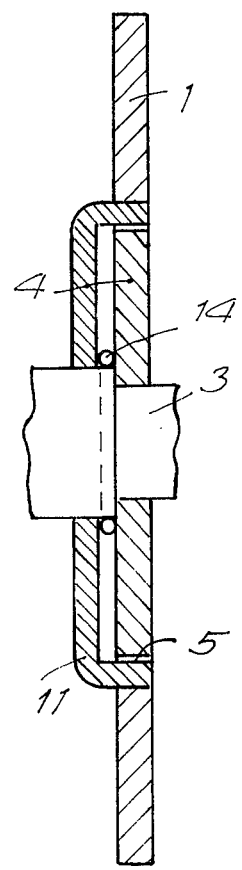

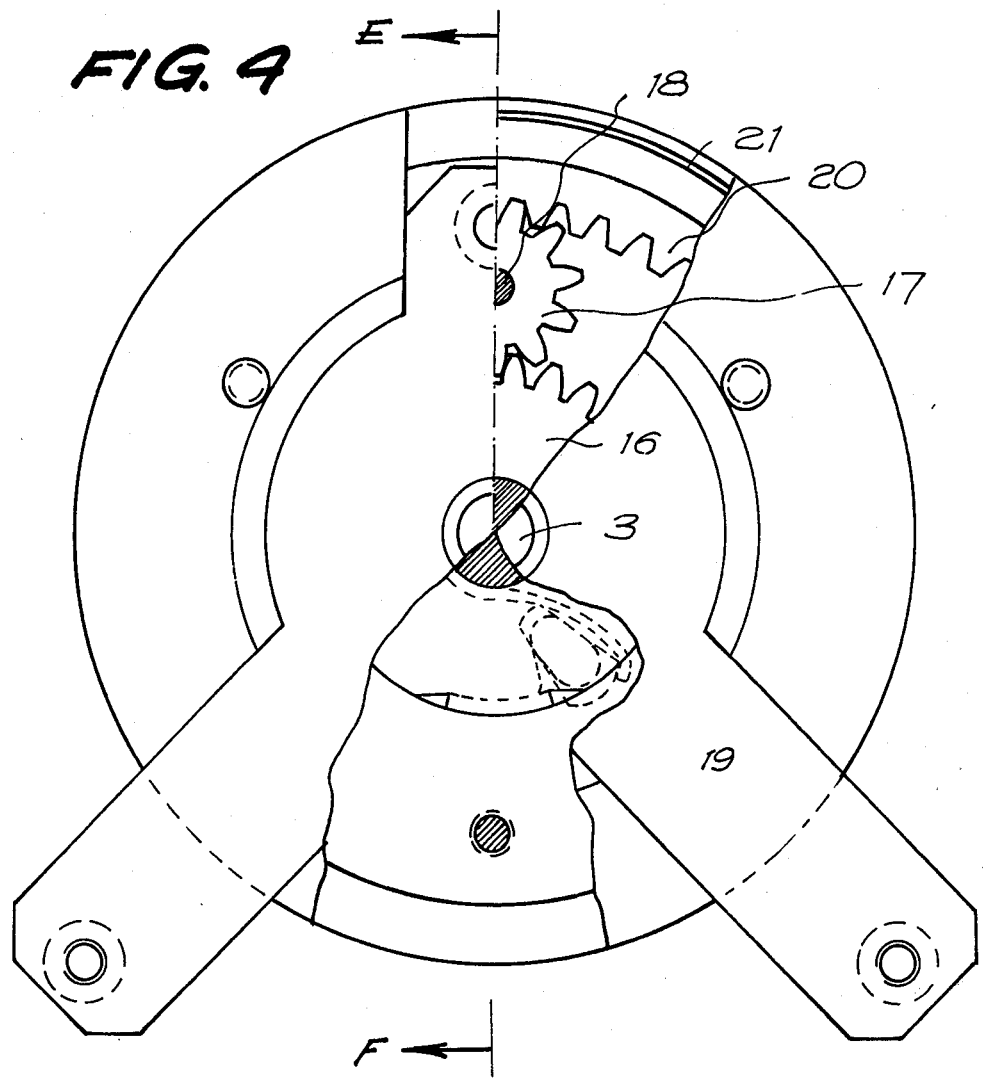

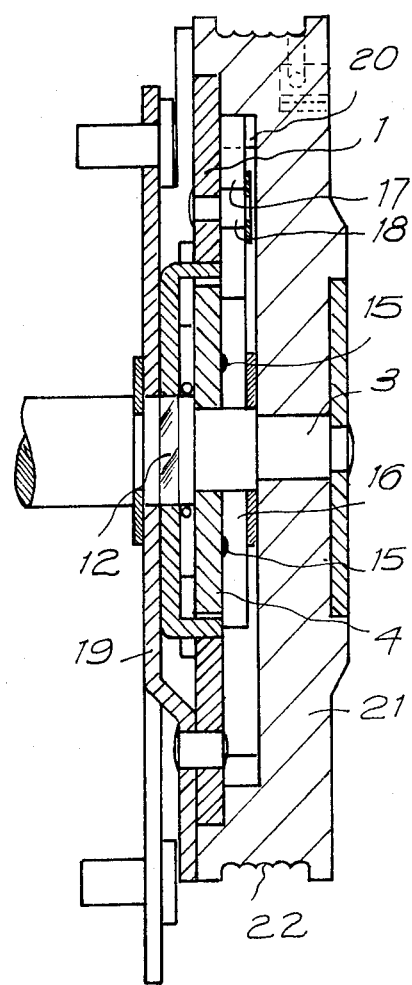

4,235,319

CLUTCH MECHANISM

FIELD OF THE INVENTION

The present invention relates to a clutch mechanism for use in rotationally operated devices. In particular the present invention relates to a clutch mechanism which is designed to be irreversible in both directions unless operation is effected by means of a shaft specially provided.

BACKGROUND OF THE INVENTION

Mechanisms which either for purely functional reasons or for safety reasons require irreversibility of their operation, unless they are intentionally operated in one direction of rotation or the other, are known and used. This is the case for example with mechanisms for raising and lowering windows in vehicles, in which in order to prevent accidental opening it is a basic requirement that the raising and lowering of the window should be able to be controlled solely and exclusively by an operator through operation of an appropriate crank.

Nevertheless, some of the mechanisms used up to the present time for this purpose have the disadvantage of being excessively complicated so that they are expensive, and the disadvantage of being ineffective in practice and easily opened by unauthorized persons of average skill. Other known mechanisms are constantly breaking down due to their simplicity.

SUMMARY OF THE INVENTION

It is an object of the present invention to provide a clutch mechanism combining the advantages of simplicity of construction with the technical characteristics required for effective operation. It is a further object of the present invention to provide a clutch mechanism for use in window raising and lowering devices in vehicles which provide a real safeguard against unauthorized opening. It is another object of the present invention to provide a clutch mechanism which can be applied to any rotatable element without the specific construction of the mechanism having to be changed and without any considerable modifications or conversions of the element having to take place.

According to the present invention there is provided a clutch mechanism comprising a support element having a circular opening therein, a disc located concentrically in the said opening, a wedge element disposed in a wedge-shaped recess in a periphery of the said disc and elastically urged by spring means towards a lug which is angularly disposed with respect to the said element and towards an apex of the said wedge-shaped recess formed between the said disc and the said support member, the said lug being connected to a drive shaft mounted co-axial with the opening so that turning the shaft moves the said lug through an angle to co-act with the said wedge element and so to rotate the said disc, there being more than one said recess in the periphery of the said disc each associated with its own wedge element and lug so that turning the shaft in either direction moves a lug against a wedge element to rotate the disc in the said direction and turning the disc in either direction moves a wedge element towards the said apex.

The said wedge element may be one of a variety of forms, for example, in the form of rollers, in the form of elongate members having rounded ends, or the like. Preferably a support plate co-axial with the said disc connects the said lugs to the said shaft. Conveniently, each said wedge element is rotatably seated in an angled portion of its respective recess and has projecting flange means extending between the said support plate and the said disc and adjacent the said support element to retain and guide the said wedge element. Each lug can be accommodated in a portion of the recess holding its respective wedge element, the said portion being of greater angular extent than the said lug.

The irreversible effect of the mechanism is based on the locking of the aforesaid wedges between the disc and the support element surrounding it. The provision of spring means urging each wedge element towards the apex of its respective recess aids the locking action of the wedge element. The wedge elements may be urged by a single spring means or, alternatively, each wedge element may be provided with respective individual spring means which is located between its respective wedge element and a seat in the recess opposite to the said apex of the recess. Where two wedge elements are present they may be elastically urged in their respective directions by a spring in the form of a bow of steel wire or the like which is mounted at its mid point on the shaft and bears at its respective ends against the said two wedge elements. The provision of a single spring means is preferred as individual springs for each wedge would unnecessarily complicate and increase the cost of the mechanism without necessarily providing any practical advantage.

DESCRIPTION OF THE PREFERRED EMBODIMENTS

In the drawings:

FIG. 1 is a front elevational view of a mechanism embodying the invention;

FIGS. 2 and 3 are two sections on the lines A–B and C–D respectively in FIG. 1;

FIG. 4 is a front elevational view, partly in section, of a window raising and lowering device for a vehicle embodying the present invention;

FIG. 5 shows a section on the line E–F in FIG. 4; and

Figure 6:
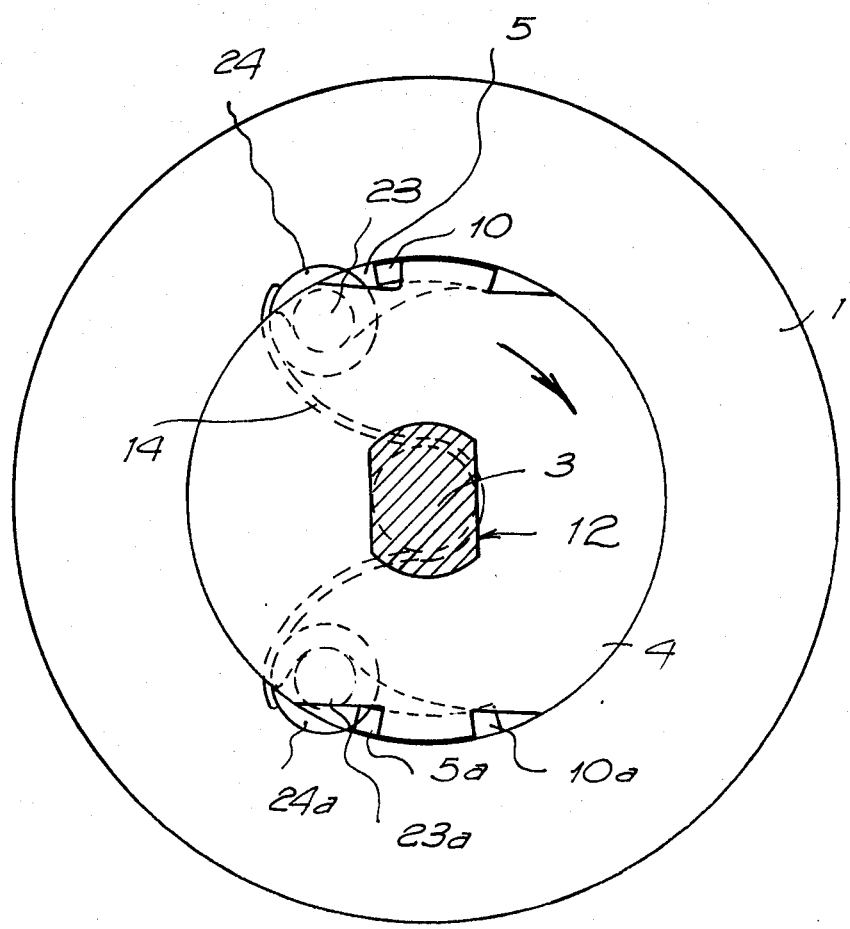
FIG. 6 is a view of a modified form of construction of the mechanism shown in FIGS. 1 to 3.

Referring firstly to FIGS. 1 to 3, a support element 1 is provided with a circular opening 2 in which is concentrically disposed an operating shaft 3. A disc 4 is mounted co-planar with the said plate 1 and freely rotatably on the shaft 3.

The periphery of the disc 4 has asymmetric wedge-shaped cutouts 5 and 5a, formed by respective side walls 6,6a and 7,7a, the walls 7,7a being more nearly radial in direction and therefore shorter than the walls 6,6a. An apex to each wedge-shaped cutout is provided between the side wall 7 and 7a and the support element 1. Within the said cutouts 5 and 5a are disposed respective elongate wedge elements 8 and 8a which are supported at their inner rounded ends at an angled portion of the respective cutouts.

The cutouts 5 and 5a have respective circumferential extensions 9 and 9a which lead from their respective cutouts in different directions so that they are disposed diametrically opposed to each other. Lugs 10 and 10'a are located in respective extensions 9 and 9a and are provided on a support plate 11 which is mounted on the operating shaft 3. The support plate 11 is rotatable with the shaft 3, being fastened thereto for example, by means of corresponding facetted zones 12, keys, or the like. The extensions 9 and 9a have a length slightly greater than that of the said lugs 10 and 10a received in them.

Each of the wedge elements 8 and 8a has at each of its rounded ends projecting flanges 13 and 13a respectively which are disposed behind the disc 4 and support element 1, being retained and guided in the spaces formed between on the one hand the disc 4 and the support element 1 and on the other hand the support plate 11, without being able to be released therefrom.

The centre of a bow spring 14 bears against the shaft 3 whilst its free ends bear against respective wedge elements 8 and 8a to urge the wedge elements 8 and 8a towards the apex of the respective cutout.

The operation of the mechanism shown in FIGS. 1 to 3 will now be described.

When the shaft 3 is operated by turning it in an anti-clockwise direction, for example, taking as starting point the position shown in FIG. 1, the plate 11 rotates with it and the lug 10a bears against the wedge element 8a causing it to move against the opposing bias action of the spring 14 towards the side wall 6a of the cutout 5a . At the same time the force of the spring 14 holds the other wedge element 8 floating because the lug 10 of the plate 11 bears against the opposite end of the extension 9 assisting the turning movement of the disc 4. The mechanism therefore turns freely in the direction in which the shaft 3 is turned.

If the direction of rotation of the shaft 3 is reversed, the positions of the aforesaid parts will be reversed and free rotation will likewise be possible in the opposite direction to that previously mentioned.

Nevertheless, if the action does not come from the shaft 3, but from an external force acting on the disc 4, for example once again assuming rotation of the disc 4 in an anti-clockwise direction, the wedge element 8a will remain free and the wedge element 8 will lock into the apex of the cutout 5, the pressure of the spring 14 contributing towards this action. If action is applied in the opposite direction on the disc 4, it will be the wedge element 8a that will be locked against its respective apex of the cutout 5a. Rotation in either direction of the disc 4 is thus prevented.

The length of the head of the lugs 10 and 10a must always be slightly less than that of the extensions 9 and 9a of the cutouts 5 and 5a in which they are received in order to supply the necessary play to enable them to bear against the wedges 8 and 8a during the operating movement of the shaft 3, and against the opposite end of the respective extension 9 or 9a when the shaft 3 moves in the opposite direction.

The cutouts 5 and 5a will preferably be symmetric with respect to each other so that the movements of the wedge elements 8 and 8a will be corresponding but inverse in all cases.

In order to apply the mechanism described to any device whose irreversibility must be maintained - as in the case of a window raising and lowering device for a vehicle - it will be sufficient to connect it to the said device in such a manner that the operative parts of the latter are connected for operating purposes to the disc 4. In this way, only when the disc 4 is operated by means of the shaft 3 will it be possible to operate the movable parts of the said device, as described above.

FIGS. 4 and 5 show a window raising and lowering device suitable for use in a vehicle. On the disc 4 there is fastened, for example by spot welding 15 or the like, a pinion 16 adapted to drive a planet wheel 17 whose shaft 18 is mounted on the support element 1 which in turn is fastened to a mounting 19.

The planet wheel 17 meshes with a crown wheel 20 which forms part of an inside face of a drum 21, which, for example, has a grooved recess 22 which is intended to receive a cable or the like for operating a window support mounting which is not illustrated but may be of conventional construction.

Both the pinion 16 and the drum 21 are mounted for free rotation on the shaft 3. The consequence of this arrangement is easy to understand: when the shaft 3 is operated by means of a corresponding crank, the subsequent rotation of the disc 4 in the same direction will drive the pinion 16 fastened to it, and the pinion 16 will in turn transmit the movement to the planet wheel 17. The planet wheel 17 will transmit the movement to the crown wheel 20 fastened to the drum 21, so that the drum 21 can be turned in the desired direction, either raising or lowering the window. If on the other hand action should come from a force applied, for example, to the window and consequently transmitted to the drum 21, the latter will tend to transmit the rotation through the crown wheel 20 to the planet wheel 17 and through the latter to the pinion 16 connected to the disc 4 which, as has previously been described, will be locked by the action of the wedges 8 and 8a in either direction of rotation.

Although in the description above particular reference is made to a device for raising and lowering windows in vehicles, this is only one case of an example of application which does not in any way limit its possibilities of application to ay element or device for which irreversibility is needed. The case described nevertheless constitutes a very characteristic example, because it makes it possible to obtain a double safety action for the vehicle to which it is fitted.

FIG. 6 illustrates a modified form of construction of clutch mechanism in which the parts 8 and 8a have been replaced by simple rollers 23 and 23a on which the retaining flanges 24 and 24a are in the form of peripheral collars. In addition, the cutouts 5 and 5a have a lengthened form so that they themselves form the extensions for receiving the lugs 10 and 10a of the plate 11, similarly to the previous example.

The advantages of the embodiment of FIG. 6 can be of a practical and economic nature and include greater ease of machining both the disc 4 and the wedges 23,23a in the form of rollers. The functioning of the modified mechanism illustrated in FIG. 6 is identical to that described in connection with the case illustrated in FIGS. 1 to 3.

It should finally be pointed out that the bow spring 14 can be replaced by individual springs disposed between the side walls 6,6a of respective cutouts 5,5a and the wedge elements 8,8a or 23,23a, appropriate seats being provided for them for this purpose.

What is claimed is:

1. A clutch mechanism comprising a support element having a circular opening therein, a disc located concentrically in said opening, a wedge element disposed in a wedge-shaped recess in a periphery of said disc and elastically urged by spring means towards a lug which is angularly disposed with respect to said element and towards an apex of said wedge-shaped recess formed between said disc and in said support member, said lug being connected to a drive shaft mounted co-axial with the opening so that turning the shaft moves said lug through an angle to co-act with said wedge element and rotate said disc, a support plate co-axial with said disc connecting said lugs to said shaft, said wedge element being rotatably seated in an angled portion of its respective recess and having projecting flange means extending between said support plate and said disc and adjacent said support element to retain and guide said wedge element there being more than one recess in the periphery of said disc each associated with its own wedge element and lug so that turning the shaft in either direction moves a lug against a wedge element to rotate the disc in said direction and turning the disc in either direction moves a wedge element towards said apex.

2. A clutch mechanism as claimed in claim 1 wherein each said wedge element is elongate having one end seated in said angled portion.

3. A clutch mechanism as claimed in claim 1 wherein each said wedge element is in the form of a roller and said projecting flange is in the form of a collar.

* * * * *